US008650846B2

(12) United States Patent
Wuebbels

(10) Patent No.: US 8,650,846 B2
(45) Date of Patent: Feb. 18, 2014

(54) MACHINE FOR HARVESTING STALK-LIKE PLANTS WITH AN ELECTRICALLY DRIVEN CUTTING MECHANISM

(75) Inventor: Richard Wuebbels, Borken (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/180,958

(22) Filed: Jul. 12, 2011

(65) Prior Publication Data
US 2012/0174552 A1 Jul. 12, 2012

(30) Foreign Application Priority Data
Jul. 15, 2010 (DE) .......................... 10 2010 031 363

(51) Int. Cl.
*A01D 45/02* (2006.01)
(52) U.S. Cl.
USPC .............................................. 56/94
(58) Field of Classification Search
USPC .............. 56/94, 16.4 R, 10.1, 10.2 R, 10.2 A, 56/10.5–10.8, 13.5–13.8, 16.7, 17.5, 502, 56/DIG. 7, DIG. 15
See application file for complete search history.

(56) References Cited

U.S. PATENT DOCUMENTS

| 3,385,043 | A | * | 5/1968 | Seymore ........................ 56/503 |
| 3,618,304 | A | * | 11/1971 | Hundhausen .................. 56/16.9 |
| 4,594,842 | A | * | 6/1986 | Wolters et al. .................... 56/94 |
| 5,615,540 | A | * | 4/1997 | Yang ............................. 56/11.9 |
| 5,809,765 | A | * | 9/1998 | Hastings et al. ................ 56/295 |
| 5,826,415 | A | * | 10/1998 | Becker ............................... 56/66 |
| 6,032,444 | A | * | 3/2000 | Herron et al. ..................... 56/60 |
| 2005/0120696 | A1 | * | 6/2005 | Lohrentz et al. ................ 56/192 |
| 2007/0272510 | A1 | * | 11/2007 | Kawakami .................... 192/215 |

FOREIGN PATENT DOCUMENTS

| EP | 1609351 | 12/2005 |
| EP | 1862057 | 12/2007 |
| EP | 2047738 | 4/2009 |
| GB | 1593698 | 7/1981 |

OTHER PUBLICATIONS

European Search Report, Sep. 30, 2011, 3 pages.

* cited by examiner

*Primary Examiner* — Thomas B Will
*Assistant Examiner* — Mai Nguyen
(74) *Attorney, Agent, or Firm* — Quarles & Brady LLP

(57) ABSTRACT

A machine is provided for harvesting stalk-like plants. The machine has at least one mowing and pick-up mechanism that comprises a cutting mechanism that can be set into a rotational movement for cutting plant stalks, and a feed mechanism arranged above the cutting mechanism for taking in and discharging the cut plant stalks. The cutting mechanism is drivably connected to an electric motor allocated to it.

5 Claims, 3 Drawing Sheets

MACHINE FOR HARVESTING STALK-LIKE PLANTS WITH AN ELECTRICALLY DRIVEN CUTTING MECHANISM

FIELD OF THE INVENTION

The invention relates to a machine for harvesting stalk-like plants with at least one mowing and pick-up mechanism that comprises a cutting mechanism that can be set into a rotational movement for cutting plant stalks and a feed mechanism arranged above the cutting mechanism for taking in and discharging the cut plant stalks.

BACKGROUND OF THE INVENTION

In DE 195 31 918 A1, a machine suitable for harvesting stalk-like plants, such as corn, for attachment to a forage harvester is described that has several mowing and pick-up mechanisms arranged transverse to the forward direction of travel across the field while harvesting. The mowing and pick-up mechanisms comprise a lower cutting plate similar to a circular saw blade, and feed plates arranged above this blade with recesses for taking in plants. The plants separated from the stubble left in the ground by way of the cutting plates are taken in by the feed plates and transported through the feed plates and the transverse feed drums arranged in the lower spaces on either side between the feed plates at the back sides of the mowing and pick-up mechanisms to the middle of the machine and passed to a feed channel of a forage harvester. The cutting plates and the feed plates are driven by the forage harvester by way of a mechanical drive section equipped with a gear, wherein the cutting plates are set in rotation with a higher speed than the feed plates. The drive of the cutting plates consequently takes place in a purely mechanical way and requires a relatively large, complicated, and expensive gearing for providing the required rotational speeds.

Furthermore, electromotive drives for agricultural harvesters have been proposed. For example, DE 100 34 784 A1 describes a harvester in which an electric motor is arranged within a crop conveying and/or processing mechanism for cutting, threshing, chopping, etc. Electromotive drives for driving the picking rolls of a corn picker have been described in DE 100 26 495 A1 and DE 10 2007 049 250 A1, while GB 1 593 698 A describes a tractor with mowing devices whose mowing blades are each driven by an electric motor. Finally, DE 10 2004 029 953 A1 describes a forage harvester in which the mowing and pick-up devices of the harvesting header can be driven at a variable speed by way of an overriding gear. The overriding gear is constructed as a planetary gear that is driven, on one hand, mechanically and, on the other hand, hydraulically or electrically at a variable rotational speed.

The problem forming the basis of the invention is seen in providing a machine for harvesting stalk-like plants with a cutting mechanism and a feed mechanism arranged above the cutting mechanism for taking in and discharging plant stalks, wherein this machine has a compact and low-complexity drive for the cutting mechanism.

SUMMARY OF THE INVENTION

A machine is provided that can move in a forward direction across a field and is used for harvesting stalk-like plants and is equipped with one or more mowing and pick-up mechanism(s). Each mowing and pick-up mechanism comprises a cutting mechanism that can be set into a rotational movement and is used for cutting plants from the stubble left in the ground and a feed mechanism that is arranged above the cutting mechanism and is used for taking in and discharging the cut plant stalks. The cutting mechanism is connected, with respect to driving, to an electric motor allocated to it and can be driven by this motor. The electric motor is driven while harvesting by a generator located on board a harvester carrying the machine. This could involve a direct-current motor or alternating-current (especially three-phase AC) motor.

The electric motor thus provides the energy for driving the cutting mechanism and can generate the required rotational speeds without a problem, so that, in one advantageous embodiment, a gear between the output shaft of the electric motor and the cutting mechanism can be eliminated. In this way, a complicated mechanical gear for the mechanical driving of the cutting mechanism is left out.

The electric motor comprises a stator supported on a frame of the machine and a rotor connected, with respect to driving, to the cutting mechanism. Advantageously, the rotor is arranged within the stator, although the inverse arrangement is also conceivable.

The feed mechanism advantageously comprises several feed plates arranged one above the other with pockets that are distributed around their peripheries and can be set in rotation about an axis running coaxial to the axis of the cutting mechanism by way of a drive. In a preferred embodiment of the invention, the feed mechanism is driven by way of a mechanical drive section that comprises a shaft extending through the inner space of the electric motor coaxial to the rotor and stator. The arrangement for driving the moving elements of the mowing and pick-up mechanism consequently has a very compact construction.

BRIEF DESCRIPTION OF THE DRAWINGS

Embodiments of the invention are described in detail below with reference to the accompanying drawings wherein.

DESCRIPTION OF THE PREFERRED EMBODIMENT

Figure 1:
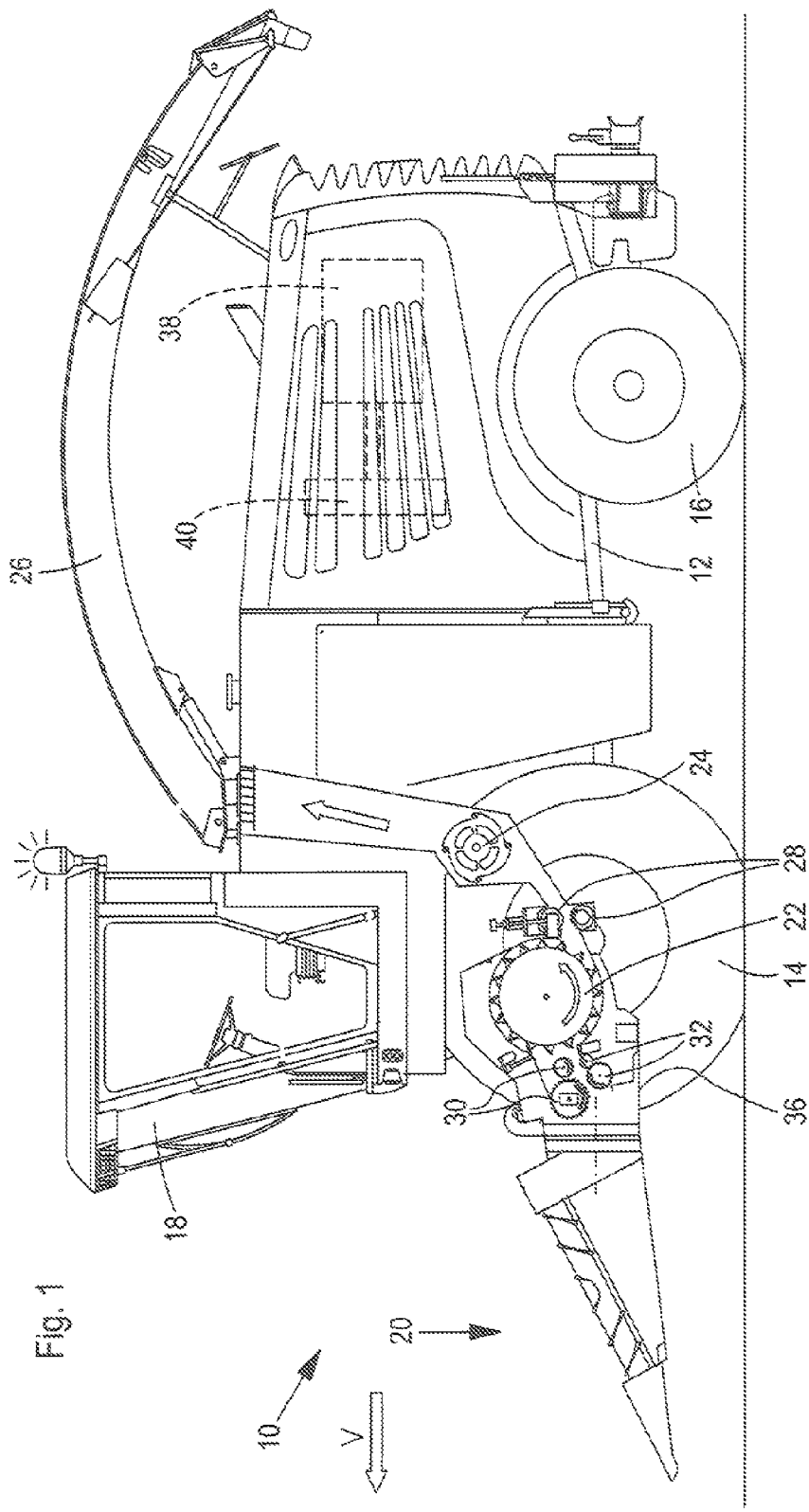
FIG. 1 is a side view of a harvester for harvesting stalk-like plants.

A harvester 10 shown in FIG. 1 in the form of a self-propelled forage harvester is built on a frame 12 that is supported by driven front wheels 14 and steering rear wheels 16. The control of the harvester 10 is realized from a operator's station 18 from which a harvesting header in the form of a machine 20 for harvesting stalk-like plants can be seen. Crop picked up from the ground by way of the machine 20, e.g., corn, grain, or the like, is pre-compacted by upper pre-press rolls 30 and lower pre-press rolls 32 and fed to a chopping drum 22 that chops it into small pieces and discharges it to a feed device 24. The crop leaves the harvester 10 to a trailer moving alongside by way of an outlet mechanism 26 that is moveable in its position. Between the chopping drum 22 and the feed device 24, a secondary crushing device 28 extends through which the crop to be conveyed is fed tangentially to the feed device 24. In the following, directional specifications, such as front, back, left, and right, refer—if not mentioned otherwise—to the forward direction V of the harvester 10 that runs, in FIG. 1, from right to left. The machine 20 is fastened detachably to the feed channel 36 of the harvester 10 in which the upper pre-press rolls 30 and lower pre-press rolls 32 are located.

The drive of the chopping drum 22, the secondary crushing mechanism 28 and the feed device 24 is realized by way of a combustion engine 38 through a mechanical drive section. The combustion engine 38 also drives other elements of the harvester 10 that can be driven, such as a hydraulic pump assembly that supplies, in turn, a hydraulic motor for driving the wheels 14 and for all-wheel drive 16, as well as a hydraulic motor for driving the pre-press rolls with a pressurized hydraulic fluid. In addition, the combustion engine 38 drives an electric generator 40.

Figure 2:
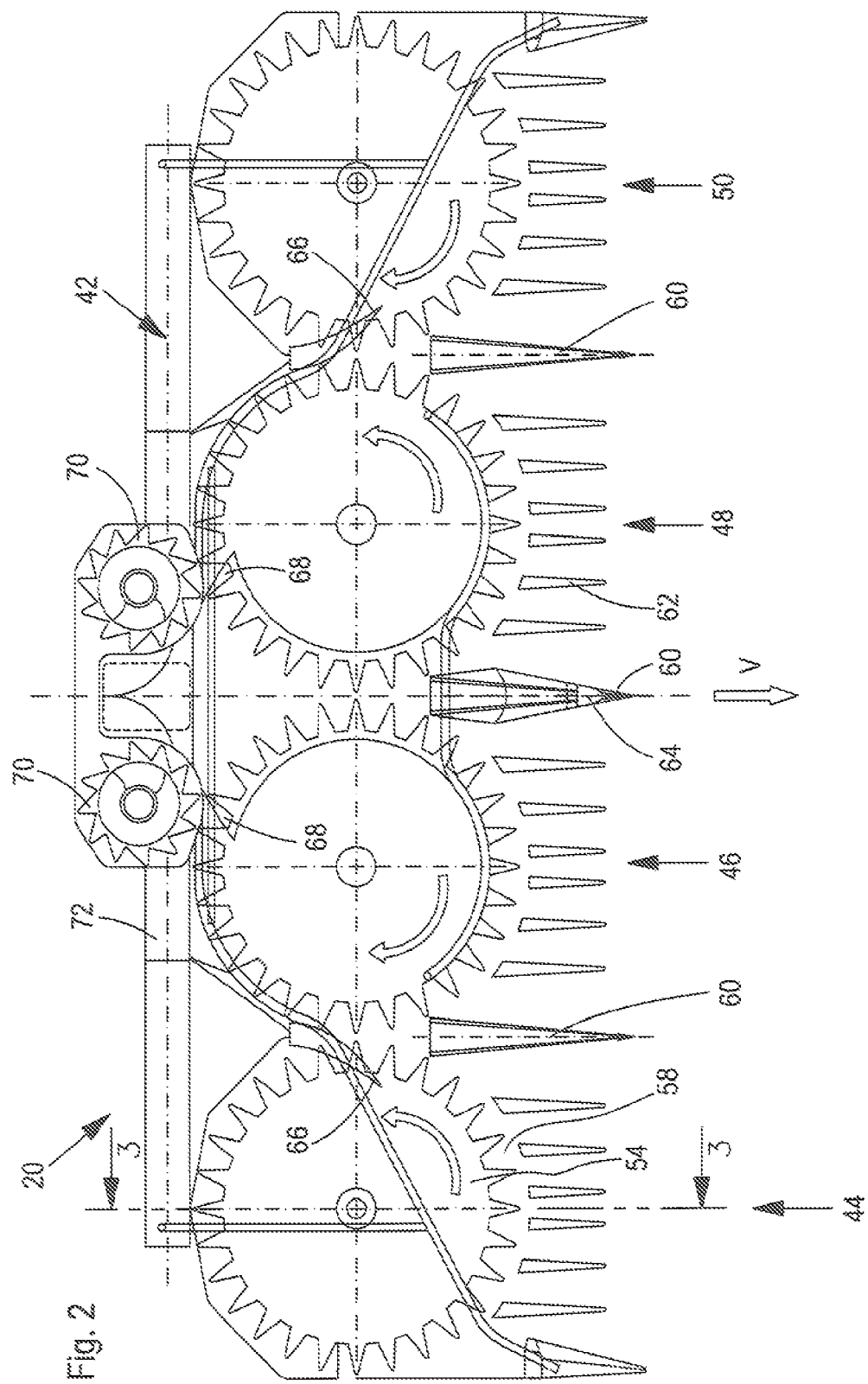
FIG. 2 is a top view of the machine of FIG. 1.

The machine 20 is shown in a top view in FIG. 2. It comprises a support frame 42 on which four mowing and pick-up mechanisms 44, 46, 48, 50 are mounted laterally one next to the other. The mowing and pick-up mechanisms 44 to 50 are each assembled from a lower cutting mechanism that can be set in rotation (FIG. 3) in the form of a cutting plate 52 and several feed plates 54 that are arranged coaxially above this cutting plate and can be set in rotation and are used as the feed mechanism. The cutting plates 52 are provided at the edge with a cutting edge 56 that is equipped with sharp teeth or is sharpened in some other way, in order to separate the plant stacks from the stubble left in the ground. The stalks are taken into pockets 58 of the feed plates 54 and are transported as described below to the harvester 10 that moves the machine 20 across a field in the forward direction V.

Between the mowing and pick-up mechanisms 44 to 50, there are stalk dividers 60 in order to deflect the plants laterally and to bring them into the engagement region of the mowing and pick-up mechanisms 44 to 50, when necessary. Smaller stalk dividers 62 are arranged at the front sides of the mowing and pick-up mechanisms 44 to 50. The working width of each mowing and pick-up mechanism 44 to 50 corresponds to two rows, i.e., approximately 1.5 m. The machine 20 can thus simultaneously harvest eight rows of corn sown at a spacing of 75 cm. Through other dimensioning and/or numbers of mowing and pick-up mechanisms 44 to 50, any other working width could also be achieved.

During harvesting, the mowing and pick-up mechanisms 44 to 50 rotate in the directions indicated by the arrows. The inner mowing and pick-up mechanisms 46, 48 adjacent to the longitudinal middle plane 64 thus convey the plants initially outward and rearward, while the outer mowing and pick-up mechanisms 44, 50 rotate in opposite directions relative to the mowing and pick-up mechanisms 46, 48 adjacent to them. As can be seen with reference to FIG. 1, the outer mowing and pick-up mechanisms 44, 50 transfer their crop approximately in the middle between the rotational axes of the mowing and pick-up mechanisms 44, 46 and 48, 50, respectively, to the inner mowing and pick-up mechanisms 46, 48, which is why clean-out devices 66 are provided. At the back side of the inner mowing and pick-up mechanisms 46, 48, the crop is raised out from the pockets 58 by additional clean-out devices 68 and transferred to feed drums 70 that rotate about axes inclined slightly forward and overcome the height difference between the base of the machine 10 and the subsequent pick-up rolls of the feed channel of the forage harvester.

Figure 3:
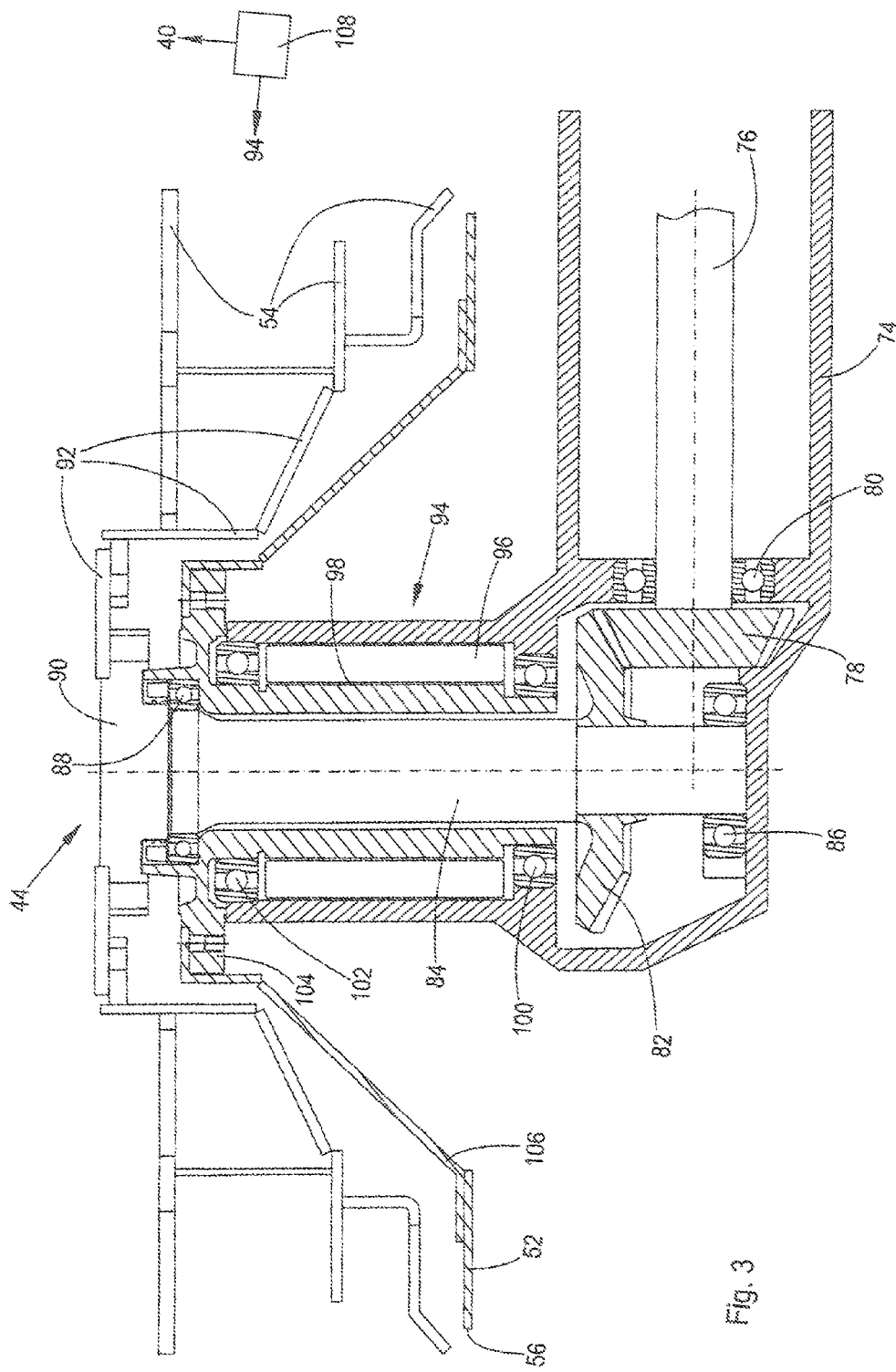
FIG. 3 is a section through the machine along the line 3-3 of FIG. 2.

FIG. 3 shows a section through the machine 20 along the line 3-3 of FIG. 2. A hollow transverse carrier 72 of the support frame 42 carries gear housing 74 on which a mowing and pick-up mechanism 44 (or 46, 48 or 50) is supported, and from which mounting tubes for the divider tips 62 extend forward. In the gear housing 74 there is the mechanical drive section for driving the feed plates 54, wherein this drive section comprises a first shaft 76 that extends from transverse carrier 72 forward up to a first bevel gear 78 and is supported in a bearing 80 at the back of the bevel gear 78. With the first bevel gear 78 meshes a second bevel gear 82 that is coupled with the lower end of a second shaft 84 that is supported in a lower bearing 86 and an upper bearing 88. The second shaft 84 extends at an angle forward and upward and is connected at its upper end to a holder 90 that carries flanges 92 on which the feed plates 54 are fastened. The feed plates 54 are consequently driven by the first shaft 76 that is driven, on its side, by way of a transverse shaft (not shown) within the transverse carrier 72 and an articulated shaft (not shown) of the harvester 10, whether it is by way of an additional, purely mechanical drive section of the combustion engine 38 or by way of an allocated hydraulic motor (not shown). In both cases, the rotational speed of the feed plates 54 can be constant or variable.

The drive of the cutting plate 52 is realized by way of an electric motor 94 that is allocated to this plate and is arranged within a vertical section of the gear housing 74 and comprises a stator 96 as well as a rotor 98. The rotor 98 is arranged in the inner space of the stator 96 and surrounds the second shaft 84 concentrically. The rotor 98 is supported by lower and upper bearings 100, 102 in a rotating manner on the vertical section of the gear housing 74. The rotor 98 is connected on its upper end by way of an upper flange 104 extending in the radial direction and a holding ring 106 to the actual cutting plate 52, i.e., without gears or the like connected in-between. The rotor 98 and the second shaft 84 can rotate independently of each other.

During operation, the generator 40 supplies the electric motor 94 with electrical energy. The electric motor 94 can be of an arbitrary kind (direct-current or alternating-current or three-phase current motor, e.g., in a synchronous or asynchronous construction) and sets the cutting plate 52 into an advantageously faster rotation than the feed plates 54 in the same direction or in the opposite direction relative to the feed plates 54. In addition to the compact configuration of the arrangement for driving the cutting plate 52, the electric motor 94 also offers the advantage that a quick start-up of the cutting plate 52 is possible, in that after the drive of the cutting plate 52 is shutdown, the braking effect of the electric motor 94 is increased electrically by a suitable control circuit 108 of the electric motor 94 (e.g., derivation of the EMF by way of a resistor). The previously used free-wheeling hubs and brakes for the cutting plates 52 are consequently no longer needed, which keeps the expense and spatial requirements of the arrangement low for the drive of the cutting plates 52.

Having described the preferred embodiment, it will become apparent that various modifications can be made without departing from the scope of the invention as defined in the accompanying claims.

The invention claimed is:

1. A machine for harvesting stalk-like plants with a plurality of mowing and pick-up mechanisms that each comprise a cutting mechanism that can be set into a rotational movement for cutting plant stalks and a feed mechanism arranged above the cutting mechanism for taking in and discharging the cut plant stalks;

wherein the feed mechanisms are driven by a mechanical drive train from a harvesting machine and the cutting mechanisms are drivably connected to a respective electric motor allocated to the respective cutting mechanism;

wherein each cutting mechanism includes a cutting plate and each feed mechanism includes a feed plate;

wherein each electric motor comprises a stator supported on a frame of the machine and a rotor connected to the respective cutting mechanism, and in that the rotor is arranged within the stator; and wherein each feed mechanism is driven by way of a drive section that comprises a shaft extending coaxial to the respective rotor and the respective stator through an inner space of the respective electric motor.

2. A machine according to claim 1, wherein each cutting mechanism is drivably connected to the respective electric motor without the connection of a gear in-between.

3. A machine according to claim 1, wherein each feed mechanism comprises several feed plates arranged one above the other with pockets that are distributed around their periphery and are set into rotation about an axis running coaxial to the axis of the respective cutting mechanism by way of a drive.

4. A machine according to claim 1, wherein the electric motor are connected electrically to a control circuit that is operated for increasing the braking effect of the electric motors after a shutdown.

5. A machine according to claim 1, wherein each rotor is connected to the respective cutting mechanism by at least one flange and at least one holding ring.

\* \* \* \* \*

UNITED STATES PATENT AND TRADEMARK OFFICE
CERTIFICATE OF CORRECTION

| | |
|---|---|
| PATENT NO. | : 8,650,846 B2 |
| APPLICATION NO. | : 13/180958 |
| DATED | : February 18, 2014 |
| INVENTOR(S) | : Richard Wuebbels |

It is certified that error appears in the above-identified patent and that said Letters Patent is hereby corrected as shown below:

In the Claims

Col. 5, line 13, claim 4, "motor are" should read --motors are--

Signed and Sealed this
Twenty-seventh Day of May, 2014

Michelle K. Lee
*Deputy Director of the United States Patent and Trademark Office*